United States Patent Office 3,030,422
Patented Apr. 17, 1962

3,030,422
SOLID ORGANOBORON COMPOUND
Sheldon L. Clark, Buffalo, and Delmer A. Fidler, Niagara Falls, N.Y., assignors to Olin Mathieson Chemical Corporation, a corporation of Virginia
No Drawing. Filed May 1, 1958, Ser. No. 733,245
4 Claims. (Cl. 260—606.5)

This invention relates to a new chemical compound of the formula $$B_{10}H_{13}CH_2CH_2B_{10}H_{12}CH_2CH_2B_{10}H_{12}CH_2CH_2Cl$$

and to a method for the preparation of that compound. The compound is a useful ingredient in solid propellant compositions when admixed with suitable oxidizer salts, such as various perchlorates or ammonium nitrate.

The compound of this invention can be prepared by reacting ethylene chloride and decaborane while the reaction mixture contains a suitable amount of aluminum chloride or aluminum bromide as a catalyst. The relative amounts of reactants utilized in carrying out the reaction can be varied considerably, but generally the molar ratio of the ethylene chloride to decaborane will be within the range from 0.1:1 to 2:1. Furthermore, the amount of catalyst present in the reaction mixture is subject to considerable variation, but preferably from 0.01 to 2 moles of the catalyst per mole of decaborane are present in the reaction mixture. The temperature used in carrying out the reaction is preferably within the range from 20° C. (room temperature) to 150° C., although somewhat higher and somewhat lower temperatures can be utilized, if desired.

The following examples illustrate the invention.

Example I

Decaborane, 24.4 grams (0.2 mole), and aluminum bromide, 5.2 grams (0.02 mole), were placed in a 250 ml. round-bottom flask. Ethylene chloride, 9.9 grams (0.1 mole), was added and the flask was immediately attached to a reflux condenser. There was a sudden evolution of gas and a dense white fog was observed inside the glass apparatus. This gas bubbled vigorously, when passed into a scrubber. The evolution of the gas lasted for about three minutes and then practically ceased. When the reactants became fluid, the flask was heated to an external temperature of 90 to 100° C., during which time only a small amount of additional gas was evolved. After one hour at this temperature, the heat was terminated and the reaction products cooled. The reaction mixture was hydrolyzed by pouring over ice into water. The material was extracted with benzene and the benzene was removed under reduced pressure. In this example 0.12 mole of hydrogen chloride was evolved. The remaining residual material in the distillation flask, after the removal of benzene, was distilled.

During this distillation, 12 grams of unreacted decaborane were recovered. After removal of the decaborane, the remaining material was transferred to a smaller flask and distilled, using a simple Claisen head. A small amount of liquid, approximately one gram boiling at 115 to 119° C. at a pressure of 2 mm. of Hg absolute was obtained. The remaining material would not distill at this pressure. The distillation was discontinued and the material solidified in the distillation flask. The solid was chilled in Dry Ice and then pulverized. A total of 11 grams of solid was obtained.

The solid was dissolved in both carbon tetrachloride and carbon disulfide and submitted for an infrared analysis. The analysis showed that the solid contained a weak CH and a strong BH absorption. The spectrum was identical in both carbon disulfide, methyl alcohol, acetone, benzene and diethyl ether. It was insoluble in water and became sticky when placed in ligroin or cyclohexane. The solid burned with a green flame and left a neutral residue. An elemental analysis of the solid showed that it contained 64.05 (64.80, 64.86, 63.67, 63.70) weight percent boron and 9.45 (9.20, 9.70) weight percent chlorine. The average molecular weight was 475 (465, 486). The elemental analyses and molecular weight determinations showed the solid to have the following structure:

$$B_{10}H_{13}CH_2CH_2B_{10}H_{12}CH_2CH_2B_{10}H_{12}CH_2CH_2Cl$$

The calculated molecular weight of this compound is 482 and it theoretically contains 67 percent by weight of boron and 7.44 weight percent chlorine.

The small amount of liquid, approximately one gram boiling at 115 to 119° C. at 2 mm. of mercury absolute, also obtained in this experiment contained 58.5 (58.6, 58.4) weight percent boron and 13.0 (13.0, 12.9) weight percent chlorine. An infrared analysis showed that it contained some ethyl decaborane as well as some decaborane.

Example II

This example was performed using 0.2 gram mole of decaborane, 0.1 gram mole of ethylene chloride and 0.2 gram mole of aluminum chloride. The reaction was conducted at a temperature of 85 to 100° C. for 40 minutes. A 55 percent conversion of decaborane was obtained. A total of 0.13 gram mole of hydrogen chloride was evolved. The reaction mixture was hydrolyzed with ice water and extracted with benzene and the benzene removed at reduced pressure. Distillation of the remaining material at reduced pressure gave 9 grams of decaborane, in addition to 5.5 grams of a liquid boiling at 77 to 81° C. (0.35 mm. of Hg absolute). An infrared analysis of this liquid showed that it contained some decaborane.

The 5.5 grams of liquid was dissolved in n-pentane and cooled to −60° C. and filtered. In this manner, an additional one gram of decaborane was recovered. The pentane was then removed under reduced pressure and the remaining liquid distilled. An infrared analysis showed that the 4 grams of liquid which distilled contained decaborane. After another pentane treatment which removed approximately one gram of decaborane, the liquid weighed 1.67 grams. This liquid contained 67.65, 65.29 percent boron and 11.07, 11.14 percent chlorine.

After the distillation of the original liquid product, a polymeric solid weighing 10 grams remained in the distillation flask. The solid contained 64.32 weight percent boron and 8.1 weight percent chlorine. An infrared analysis showed that the solid was very similar to that obtained in the preceding example.

Example III

The preceding example was repeated with the exception that all reactants were doubled. The reaction mixture was heated for 60 minutes at a temperature of 80 to 100° C. During this time, 0.15 gram mole of hydrogen chloride was evolved. The reaction was hydrolyzed with ice and water and extracted with benzene in the usual manner. The liquid remaining after removal of the benzene was distilled at an absolute pressure of 0.5 mm. of mercury and yielded 8.5 grams of a liquid boiling at 80 to 90° C., together with 22.5 grams of unreacted decaborane and the usual polymeric solid.

The polymeric solid remaining in the flask upon termination of this distillation, was heated to about 200° C. (5×10⁻² mm.) and 1.5 grams of liquid, possibly containing some ethyldecaboranes, was obtained. An infrared analysis of the 14 grams of polymeric solid remaining showed that it was similar to the 10 grams of polymeric solids obtained in Example II.

An infrared analysis of the 8.5 grams of liquid showed that it contained some decaborane and was identical to the liquid obtained in Example II. The decaborane was removed from the liquid in the usual manner.

The compound of this invention can be employed as an ingredient of solid propellant compositions in accordance with the general procedures which are well understood in the art, inasmuch as the compound is readily oxidized using conventional solid oxidizers such as ammonium perchlorate, potassium perchlorate, sodium perchlorate, lithium perchlorate, ammonium nitrate and the like. In formulating a solid propellant composition employing the compound produced in accordance with the present invention, generally from 5 to 35 parts by weight of the compound containing boron and 65 to 95 percent by weight of oxidizer salt are present in the final propellant composition. In the propellant composition the oxidizer salt and the compound of this invention are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of the oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596.

What is claimed is:
1. The compound of the formula

$$B_{10}H_{13}CH_2CH_2B_{10}H_{12}CH_2CH_2B_{10}H_{12}CH_2CH_2Cl$$

2. A method for the preparation of $$B_{10}H_{13}CH_2CH_2B_{10}H_{12}CH_2CH_2B_{10}H_{12}CH_2CH_2Cl$$

which comprises reacting decaborane and ethylene chloride at a temperature within the range from 20° C. to 150° C. while the reaction mixture contains a catalytic amount of a material selected from the group consisting of aluminum chloride and aluminum bromide, and separating $$B_{10}H_{12}CH_2CH_2B_{10}H_{12}CH_2CH_2B_{10}H_{12}CH_2CH_2Cl$$

from the reaction mixture.

3. The method of claim 2 wherein said material is aluminum chloride.

4. The method of claim 2 wherein said material is aluminum bromide.

No references cited.